(12) United States Patent
Yu et al.

(10) Patent No.: US 12,349,046 B2
(45) Date of Patent: Jul. 1, 2025

(54) OVERLAPPING BASIC SERVICE SET STATUS INDICATION FOR AN ACCESS POINT COOPERATIVE TRANSMISSION

(71) Applicant: Avalon Technology Solutions LLC, Frisco, TX (US)

(72) Inventors: Heejung Yu, Daejeon (KR); Yujin Noh, Lake Forest, CA (US); Jong-ee Oh, Lake Forest, CA (US)

(73) Assignee: Avalon Technology Solutions LLC, Frisco, TX (US)

( * ) Notice: Subject to any disclaimer, the term of this patent is extended or adjusted under 35 U.S.C. 154(b) by 8 days.

(21) Appl. No.: 17/356,926

(22) Filed: Jun. 24, 2021

(65) Prior Publication Data

US 2021/0410048 A1 Dec. 30, 2021

Related U.S. Application Data

(60) Provisional application No. 63/045,718, filed on Jun. 29, 2020.

(51) Int. Cl.
*H04W 48/14* (2009.01)
*H04B 7/024* (2017.01)
(Continued)

(52) U.S. Cl.
CPC ............ *H04W 48/14* (2013.01); *H04B 7/024* (2013.01); *H04J 11/0086* (2013.01); *H04W 84/12* (2013.01)

(58) Field of Classification Search
USPC ........................................................ 370/338
See application file for complete search history.

(56) References Cited

U.S. PATENT DOCUMENTS

2012/0263091 A1\* 10/2012 Kim .......................... H04L 1/06
370/312
2014/0112175 A1\* 4/2014 Pantelidou ............ H04W 28/26
370/252
(Continued)

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
(Continued)

*Primary Examiner* — Gregory B Sefcheck
*Assistant Examiner* — Majid Esmaeilian
(74) *Attorney, Agent, or Firm* — Nutter McClennen & Fish LLP

(57) ABSTRACT

A method is described, which includes receiving, by a wireless station from a first access point, an overlapping basic service set (OBSS) status report request, which requests information from the station regarding a set of neighboring access points; transmitting, by the wireless station to the first access point, an OBSS status report that indicates path-loss characteristics of channels between the set of neighboring access points and the wireless station; receiving, by the wireless station from the first access point, an access point cooperation null data packet announcement frame, which indicates a cooperative transmission between the first access point and the second access point to the wireless station; receiving, by the wireless station from the first access point, a first null data packet and a second null data packet from the second access point, wherein the first and second null data packets are transmitted as part of the cooperative transmission.

20 Claims, 31 Drawing Sheets

(51) Int. Cl.
*H04J 11/00* (2006.01)
*H04W 84/12* (2009.01)

(56) References Cited

U.S. PATENT DOCUMENTS

| | | | | |
|---|---|---|---|---|
| 2015/0197655 | A1* | 7/2015 | Son | C08J 11/08 |
| | | | | 106/194.1 |
| 2016/0014803 | A1* | 1/2016 | Merlin | H04H 20/55 |
| | | | | 370/236 |
| 2016/0043855 | A1* | 2/2016 | Seok | H04L 1/0033 |
| | | | | 370/329 |
| 2016/0197655 | A1* | 7/2016 | Lee | H04W 48/00 |
| | | | | 370/338 |
| 2016/0365954 | A1* | 12/2016 | Lee | H04B 17/336 |
| 2017/0245305 | A1* | 8/2017 | Haines | H04W 74/0816 |
| 2017/0367118 | A1* | 12/2017 | Choi | H04W 74/004 |
| 2020/0022166 | A1* | 1/2020 | Min | H04B 17/336 |
| 2021/0076340 | A1* | 3/2021 | Naribole | H04W 74/0808 |
| 2021/0266207 | A1* | 8/2021 | Cariou | H04L 1/1685 |
| 2023/0127299 | A1* | 4/2023 | Eisen | H04W 72/232 |
| | | | | 370/338 |
| 2024/0163776 | A1* | 5/2024 | Chen | H04W 24/10 |

OTHER PUBLICATIONS

IEEE P802.11ax/D6.1, "Draft Standard for Information technology—Telecommunications and information exchange between systems Local and metropolitan area networks-—Specific requirements", Part 11: Wireless LAN Medium Access Control (MAC) and Physical Layer (PHY) Specifications, Amendment 1: Enhancements for High Efficiency WLAN, May 2020, 784 pages.
IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology—Telecommunicationsand information exchange between systems, Local and metropolitan area networks—Specific requirements, Dec. 18, 2013, 425 pages.
IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.
IEEE Std 802.11p-2010 Part 11: Wireless LAN Medium Access Control (MAC) and Physical Layer (PHY) Specifications, Amendment 6: Wireless Access in Vehicular Environments, IEEE Standard for Information technology—Telecommunications and information exchange between systems, Local and metropolitan area networks—Specific requirements, Jul. 15, 2010, 51 pages.
IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.

\* cited by examiner

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG} * 4$ μs | 3.2 μs | 0.8 μs | 312.5 kHz |
| EHT-SIG FIELD 722 | EHT SIGNAL FIELD | $N_{EHESIG} * 4$ μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF} * $ (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA} * $ (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

| Variant | B0 | B1 | B2–B29 | B30 | B31 |
|---|---|---|---|---|---|
| HT | 0 | 0 | HT Control Middle | AC Constraint | RDG/More PPDU |
| VHT | 1 | 0 | VHT Control Middle | AC Constraint | RDG/More PPDU |
| HE | 1 | 1 | A-Control | | |

FIG. 12

| Control ID value | Meaning | Length of the Control Information subfield (bits) |
|---|---|---|
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7-14 | Reserved | |
| 15 | Ones need expansion surely (ONES) | 26 |

FIG. 15

| VARIANT | B0 | B1 | B2 B3 | B4 | B5 | B6-B29 | B30 | B31 |
|---|---|---|---|---|---|---|---|---|
| HT | 0 | | HT CONTROL MIDDLE | | | | | |
| VHT | 1 | 0 | VHT CONTROL MIDDLE | | | | | |
| HE | 1 | 1 | A-CONTROL (FIRST 4-BITS, CONTROL ID) | | | A-CONTROL (REMAINING BITS) | AC CONSTRAINT | RDG/MORE PPDU |
| EHT | 1 | 1 | A-CONTROL EHT (FIRST 2-BITS) | 0 | 1 | A-CONTROL EHT (REMAINING BITS) | AC CONSTRAINT | RDG/MORE PPDU |

FIG. 16

| FIELD | SIZE | MEANING |
|---|---|---|
| NUMBER OF OBSS APS | 3 BITS (OR 1 OCTET) | THE NUMBER OF OBSS APS THAT ARE INCLUDED IN THE CURRENT OBSS STATUS REPORT FIELD<br>VALUE: 0-7 |
| AP ADDRESS 1 | 6 OCTETS (OR 6 BITS (OR 1 OCTET) IF BSS COLOR IS USED) | MAC ADDRESS (BSS COLOR) OF NEIGHBORING AP 1 |
| ... | ... | ... |
| AP ADDRESS K | 6 OCTETS (OR 6 BITS (OR 1 OCTET) IF BSS COLOR IS USED) | MAC ADDRESS (BSS COLOR) OF NEIGHBORING AP K<br>K IS DEFINED IN "NUMBER OF OBSS APS) FIELD |
| PATH-LOSS 1 | 1 OCTET | PATH-LOSS OF NEIGHBORING AP 1 IN DB SCALE.<br>THIS IS CALCULATED AS AP 1'S TX POWER (DBM) – RCPI(OR RSSI) (DBM) |
| ... | ... | ... |
| PATH-LOSS K | 1 OCTET | PATH-LOSS OF NEIGHBORING AP K IN DB SCALE.<br>THIS IS CALCULATED AS AP K'S TX POWER (DBM) – RCPI(OR RSSI) (DBM)<br>K IS DEFINED IN "NUMBER OF OBSS APS) FIELD |

FIG. 18

| FIELD | SIZE | MEANING |
|---|---|---|
| OBSS STA ADDRESS (OR AID OR PARTIAL AID) 1 | 6 OCTETS (OR 12 OR LESS BITS) IF BSS COLOR IS USED | MAC ADDRESS (AID OR PARTIAL AID) OF THE FIRST OBSS STA THAT NEEDS AN AP COOPERATIVE TRANSMISSION |
| COOPERATION TYPE 1 | 1 OCTET (OR 2 BITS) | TYPE OF AP COOPERATIVE TRANSMISSION MODE<br>FOR EXAMPLE:<br>0 : COOPERATIVE OFDMA<br>1 : COOPERATIVE BEAMFORMING<br>2 : JOINT TRANSMISSION<br>OTHER VALUES ARE RESERVED |
| ... | ... | ... |
| OBSS STA ADDRESS (OR AID OR PARTIAL AID) L | 6 OCTETS (OR 12 OR LESS BITS) IF BSS COLOR IS USED | MAC ADDRESS (AID OR PARTIAL AID) OF THE L-TH OBSS STA THAT NEEDS AN AP COOPERATIVE TRANSMISSION |
| COOPERATION TYPE L | 1 OCTET (OR 2 BITS) | TYPE OF AP COOPERATIVE TRANSMISSION MODE<br>FOR EXAMPLE:<br>0 : COOPERATIVE OFDMA<br>1 : COOPERATIVE BEAMFORMING<br>2 : JOINT TRANSMISSION<br>OTHER VALUES ARE RESERVED |

FIG. 21

| FIELD | SIZE | MEANING |
|---|---|---|
| OBSS STA ADDRESS (OR AID OR PARTIAL AID) 1 | 6 OCTETS (OR 12 OR LESS BITS) IF BSS COLOR IS USED | MAC ADDRESS (AID OR PARTIAL AID) OF THE FIRST OBSS STA THAT NEEDS AN AP COOPERATIVE TRANSMISSION |
| COOPERATION REQUEST CONFIRMATION 1 | 1 OCTET (OR 2 BITS) | TYPE OF AP CONFIRMATION INFORMATION<br>FOR EXAMPLE:<br>0 : COOPERATION ACCEPTANCE WITH REQUESTED COOPERATION MODE<br>1 : COOPERATION ACCEPTANCE WITH CHANGE TO REQUESTED COOPERATION MODE<br>2 : DECLINE THE COOPERATION REQUEST<br>OTHER VALUES ARE RESERVED |
| ... | ... | ... |
| OBSS STA ADDRESS (OR AID OR PARTIAL AID) L | 6 OCTETS (OR 12 OR LESS BITS) IF BSS COLOR IS USED | MAC ADDRESS (AID OR PARTIAL AID) OF THE L-TH OBSS STA THAT NEEDS AN AP COOPERATIVE TRANSMISSION |
| COOPERATION REQUEST CONFIRMATION L | 1 OCTET (OR 2 BITS) | TYPE OF AP CONFIRMATION INFORMATION<br>FOR EXAMPLE:<br>0 : COOPERATION ACCEPTANCE WITH REQUESTED COOPERATION MODE<br>1 : COOPERATION ACCEPTANCE WITH CHANGE TO REQUESTED COOPERATION MODE<br>2 : DECLINE THE COOPERATION REQUEST<br>OTHER VALUES ARE RESERVED |

FIG. 23

| BIT B0 (EHT) | BIT B1 (HE) | MEANING |
| --- | --- | --- |
| 0 | 0 | VERY HIGH THROUGHPUT (VHT) NDP ANNOUNCEMENT INDICATION |
| 0 | 1 | HIGH EFFICIENCY (HE) NDP ANNOUNCEMENT INDICATION |
| 1 | 0 | EXTREMELY HIGH THROUGHPUT (EHT) NDP ANNOUNCEMENT INDICATION |
| 1 | 1 | EHT AP COOPERATIVE NDP ANNOUNCEMENT INDICATION |

FIG. 26

| AID12 subfield | Description |
|---|---|
| 0 | User Info field allocates one or more contiguous RA-RUs for associated STAs |
| 1-2007 | User Info field is addressed to an associated STA whose AID is equal to the value in the AID12 subfield |
| 2008-2044 | Reserved |
| 2045 | User Info field allocates one or more contiguous RA-RUs for unassociated STAs |
| 2046 | Unallocated RU |
| 2047-4094 | Reserved |
| 4095 | Start of Padding field |

FIG. 28

```
                                                                    3000
┌─────────────────────────────────────────────────────────────────────────┐
│ RECEIVE, BY A WIRELESS STATION FROM A FIRST ACCESS POINT, AN OVERLAPPING BASIC SERVICE SET │
│ (OBSS) STATUS REPORT REQUEST, WHICH REQUESTS INFORMATION FROM THE WIRELESS STATION │
│          REGARDING A SET OF NEIGHBORING ACCESS POINTS, INCLUDING A SECOND ACCESS POINT    │
│                                        3002                                               │
└─────────────────────────────────────────────────────────────────────────┘
                                         │
                                         ▼
┌─────────────────────────────────────────────────────────────────────────┐
│ TRANSMIT, BY THE WIRELESS STATION TO THE FIRST ACCESS POINT IN RESPONSE TO RECEIPT OF THE │
│   OBSS STATUS REPORT REQUEST, AN OBSS STATUS REPORT THAT INDICATES PATH-LOSS              │
│   CHARACTERISTICS OF CHANNELS BETWEEN THE SET OF NEIGHBORING ACCESS POINTS AND THE        │
│                                WIRELESS STATION                                           │
│                                        3004                                               │
└─────────────────────────────────────────────────────────────────────────┘
                                         │
                                         ▼
┌─────────────────────────────────────────────────────────────────────────┐
│       RECEIVE, BY THE WIRELESS STATION FROM THE FIRST ACCESS POINT, AN ACCESS POINT       │
│   COOPERATION NULL DATA PACKET ANNOUNCEMENT FRAME, WHICH INDICATES A COOPERATIVE          │
│     TRANSMISSION BETWEEN THE FIRST ACCESS POINT AND THE SECOND ACCESS POINT TO THE        │
│                                WIRELESS STATION                                           │
│                                        3006                                               │
└─────────────────────────────────────────────────────────────────────────┘
                                         │
                                         ▼
┌─────────────────────────────────────────────────────────────────────────┐
│       RECEIVE, BY THE WIRELESS STATION FROM THE FIRST ACCESS POINT, A FIRST NULL DATA PACKET │
│                                        3008                                               │
└─────────────────────────────────────────────────────────────────────────┘
                                         │
                                         ▼
┌─────────────────────────────────────────────────────────────────────────┐
│    RECEIVE, BY THE WIRELESS STATION FROM THE SECOND ACCESS POINT, A SECOND NULL DATA      │
│       PACKET, WHEREIN THE FIRST NULL DATA PACKET AND THE SECOND NULL DATA PACKET ARE      │
│   TRANSMITTED AS PART OF THE COOPERATIVE TRANSMISSION BETWEEN THE FIRST ACCESS POINT AND  │
│                       THE SECOND ACCESS POINT TO THE WIRELESS STATION                     │
│                                        3010                                               │
└─────────────────────────────────────────────────────────────────────────┘
                                         │
                                         ▼
┌─────────────────────────────────────────────────────────────────────────┐
│   TRANSMIT, BY THE WIRELESS STATION TO THE FIRST ACCESS POINT AND THE SECOND ACCESS POINT,│
│     A COMPRESSED BEAMFORMING REPORT FRAME OR A CHANNEL QUALITY INDICATOR FRAME IN         │
│       RESPONSE TO BOTH THE FIRST NULL DATA PACKET AND THE SECOND NULL DATA PACKET         │
│                                        3012                                               │
└─────────────────────────────────────────────────────────────────────────┘
```

FIG. 30

```
                                                              ← 3100
┌─────────────────────────────────────────────────────────────────────┐
│ TRANSMIT, BY A FIRST ACCESS POINT TO A WIRELESS STATION, AN         │
│ OVERLAPPING BASIC SERVICE SET (OBSS) STATUS REPORT REQUEST,         │
│ WHICH REQUESTS INFORMATION FROM THE WIRELESS STATION                │
│ REGARDING A SET OF NEIGHBORING ACCESS POINTS, INCLUDING A           │
│ SECOND ACCESS POINT                                                 │
│ 3102                                                                │
└─────────────────────────────────────────────────────────────────────┘
```
```
┌─────────────────────────────────────────────────────────────────────┐
│ RECEIVE, BY THE FIRST ACCESS POINT FROM THE WIRELESS STATION, AN    │
│ OBSS STATUS REPORT THAT INDICATES PATH-LOSS CHARACTERISTICS OF      │
│ CHANNELS BETWEEN THE SET OF NEIGHBORING ACCESS POINTS AND           │
│ THE WIRELESS STATION                                                │
│ 3104                                                                │
└─────────────────────────────────────────────────────────────────────┘
```
```
┌─────────────────────────────────────────────────────────────────────┐
│ TRANSMIT, BY THE FIRST ACCESS POINT TO THE SECOND ACCESS POINT, AN  │
│ ACCESS POINT COOPERATION REQUEST, WHICH REQUESTS THE SECOND         │
│ ACCESS POINT TO PERFORM A COOPERATIVE TRANSMISSION TO THE           │
│ WIRELESS STATION                                                    │
│ 3106                                                                │
└─────────────────────────────────────────────────────────────────────┘
```
```
┌─────────────────────────────────────────────────────────────────────┐
│ RECEIVE, BY THE FIRST ACCESS POINT FROM THE SECOND ACCESS POINT,    │
│ AN ACCESS POINT COOPERATION CONFIRMATION, WHICH INDICATES THAT      │
│ THE SECOND ACCESS POINT IS TO PARTICIPATE IN THE COOPERATIVE        │
│ TRANSMISSION WITH THE FIRST ACCESS POINT                            │
│ 3108                                                                │
└─────────────────────────────────────────────────────────────────────┘
```
```
┌─────────────────────────────────────────────────────────────────────┐
│ TRANSMIT, BY THE FIRST ACCESS POINT TO THE WIRELESS STATION, AN     │
│ ACCESS POINT COOPERATION NULL DATA PACKET ANNOUNCEMENT FRAME,       │
│ WHICH INDICATES A COOPERATIVE TRANSMISSION BETWEEN THE FIRST        │
│ ACCESS POINT AND THE SECOND ACCESS POINT TO THE WIRELESS STATION    │
│ 3110                                                                │
└─────────────────────────────────────────────────────────────────────┘
```
```
┌─────────────────────────────────────────────────────────────────────┐
│ TRANSMIT, BY THE FIRST ACCESS POINT TO THE WIRELESS STATION, A      │
│ FIRST NULL DATA PACKET, WHEREIN THE FIRST NULL DATA PACKET IS       │
│ TRANSMITTED AS PART OF THE COOPERATIVE TRANSMISSION WITH THE        │
│ SECOND ACCESS POINT, WHICH TRANSMITS A SECOND NULL DATA PACKET      │
│ TO THE WIRELESS STATION                                             │
│ 3112                                                                │
└─────────────────────────────────────────────────────────────────────┘
```
```
┌─────────────────────────────────────────────────────────────────────┐
│ RECEIVE, BY THE FIRST ACCESS POINT FROM THE WIRELESS STATION, A     │
│ COMPRESSED BEAMFORMING REPORT FRAME OR A CHANNEL QUALITY            │
│ INDICATOR FRAME IN RESPONSE TO BOTH THE FIRST NULL DATA PACKET      │
│ AND THE SECOND NULL DATA PACKET                                     │
│ 3114                                                                │
└─────────────────────────────────────────────────────────────────────┘
```

FIG. 31

OVERLAPPING BASIC SERVICE SET STATUS INDICATION FOR AN ACCESS POINT COOPERATIVE TRANSMISSION

CROSS-REFERENCE TO RELATED APPLICATION

This application claims the benefit of U.S. Provisional Patent Application No. 63/045,718, filed Jun. 29, 2020, which is incorporated by reference herein in its entirety.

TECHNICAL FIELD

The present disclosure generally relates to wireless communications, and more specifically, relates to an overlapping basic service set (BSS) status indication for an access point (AP) cooperative transmission.

BACKGROUND ART

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 12 shows a high-throughput (HT) control field, in accordance with some embodiments of the present disclosure.

FIG. 15 shows a table of values for the control identifier field, in accordance with some embodiments of the present disclosure.

FIG. 16 shows a table of values for bits to distinguish different variants of the HT-control field, in accordance with some embodiments of the present disclosure.

FIG. 18 shows fields included in an OBSS status report field of an OBSS status report request, in accordance with some embodiments of the present disclosure.

FIG. 21 shows the size and meaning of several fields in an AP cooperative request frame, in accordance with some embodiments of the present disclosure.

FIG. 23 shows the size and meaning of several fields in an AP cooperation confirmation frame, in accordance with some embodiments of the present disclosure.

FIG. 26 shows bits of a sounding dialog token subfield for a NDPA, in accordance with some embodiments of the present disclosure.

FIG. 28 shows a table that describes values of an association identifier (AID) subfield, in accordance with some embodiments of the present disclosure.

FIG. 30 shows a method for performing a cooperative transmission in a wireless network, in accordance with some embodiments of the present disclosure.

FIG. 31 shows a method for performing a cooperative transmission in a wireless network, in accordance with some embodiments of the present disclosure.

DETAILED DESCRIPTION

Figure 1:
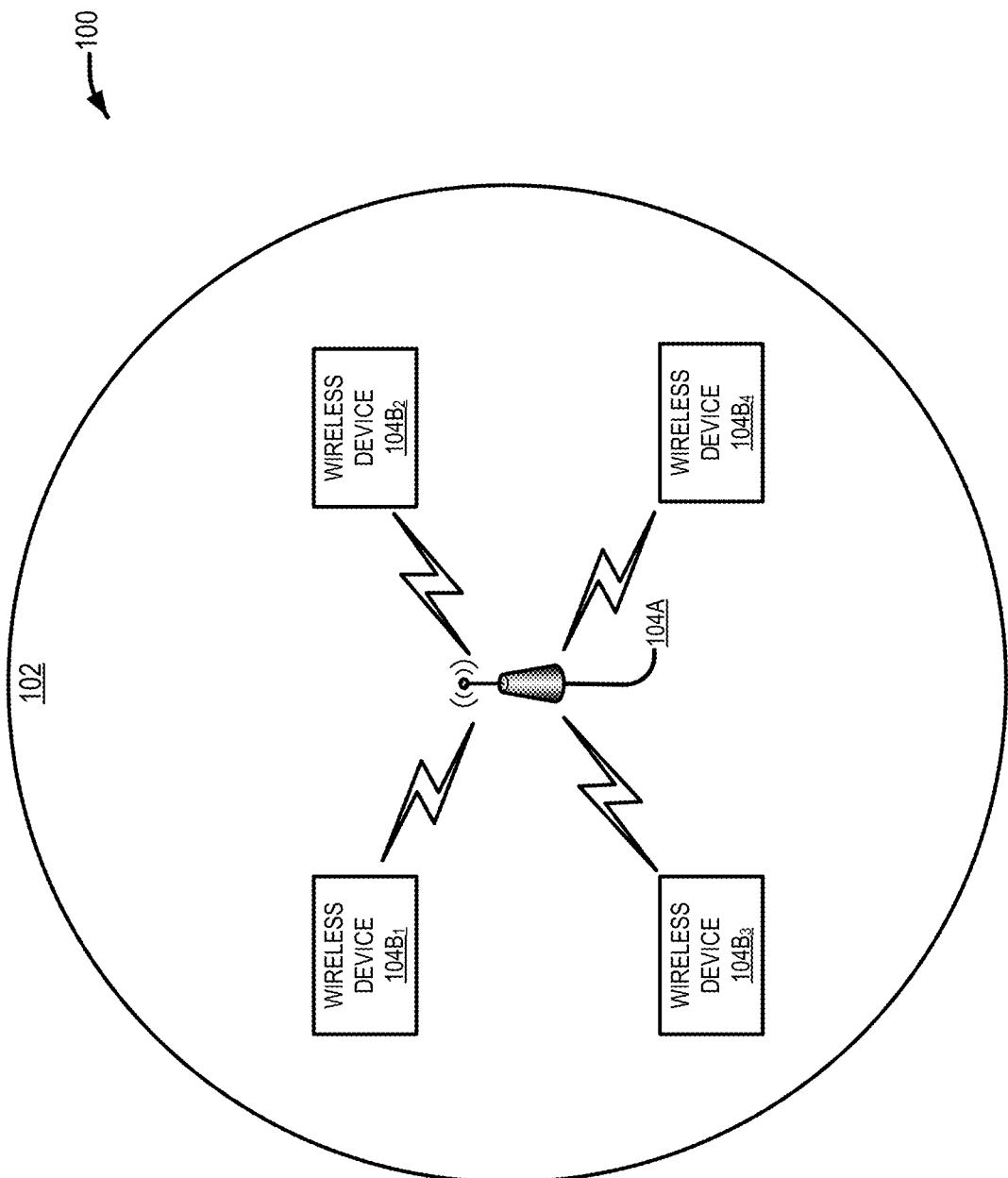
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to an overlapping basic service set (BSS) status indication for an access point (AP) cooperative transmission. In particular, because many access points (APs) have been deployed and available bandwidth in network systems is limited, the throughput performance of wireless systems (e.g., Wi-Fi systems) can become saturated due to interference from neighboring APs. AP cooperative transmission schemes can be one solution to improve throughput performance with densely deployed APs. For throughput enhancement of stations (STAs) in an overlapping area of multiple basic service set (BSS), which can be referred to as overlapping BSS STAs (OBSS STAs), an indication mechanism for the OBSS STA can function as an indication of its status to the associated AP. After the OBSS status notification, a master AP, which is the associated AP for the STA, selects a slave AP and initiates the AP cooperative transmission.

A mechanism is presented herein to identity the status of BSS overlap by using received packets from neighboring APs. Additionally, a frame exchange sequence for OBSS status identification and notification is proposed to initiate an AP cooperative transmission, such as cooperative OFDMA, cooperative beamforming, and joint transmission. In this frame exchange sequence, several types of frames are defined.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
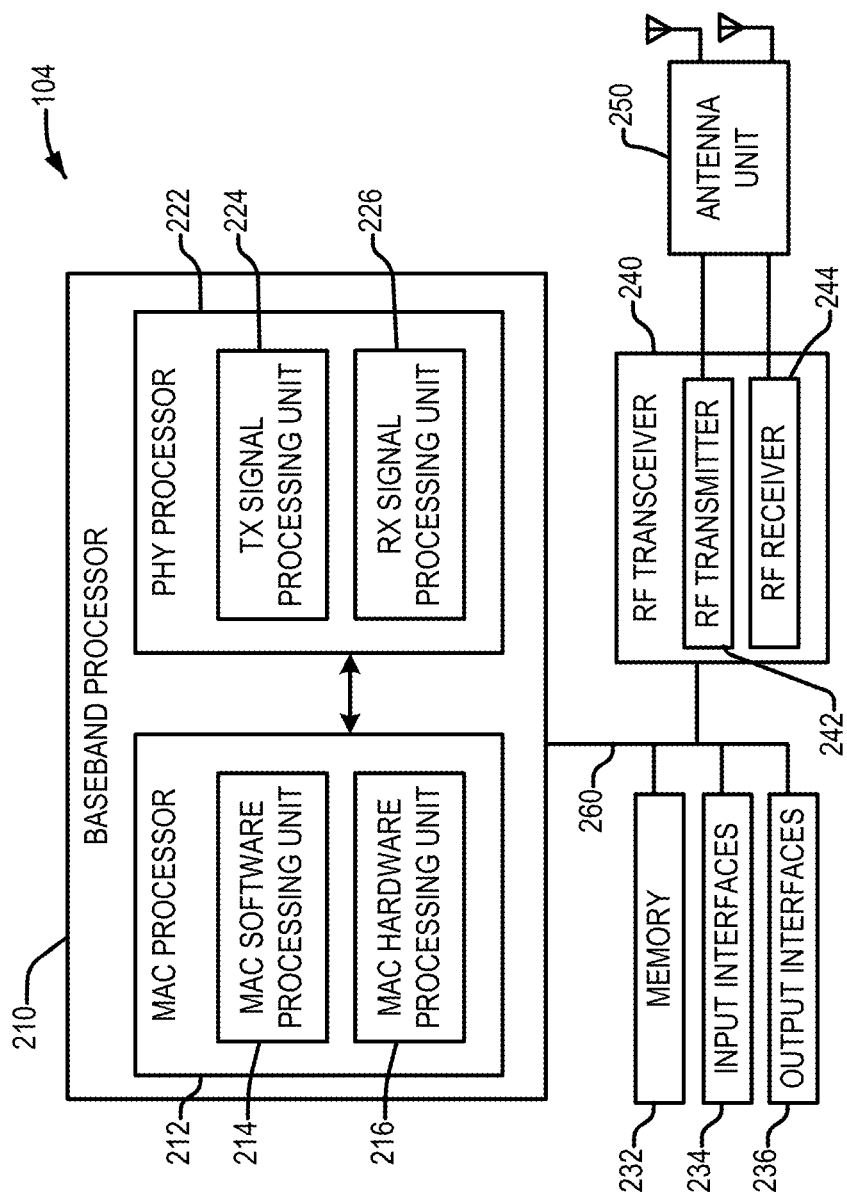
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC)

encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
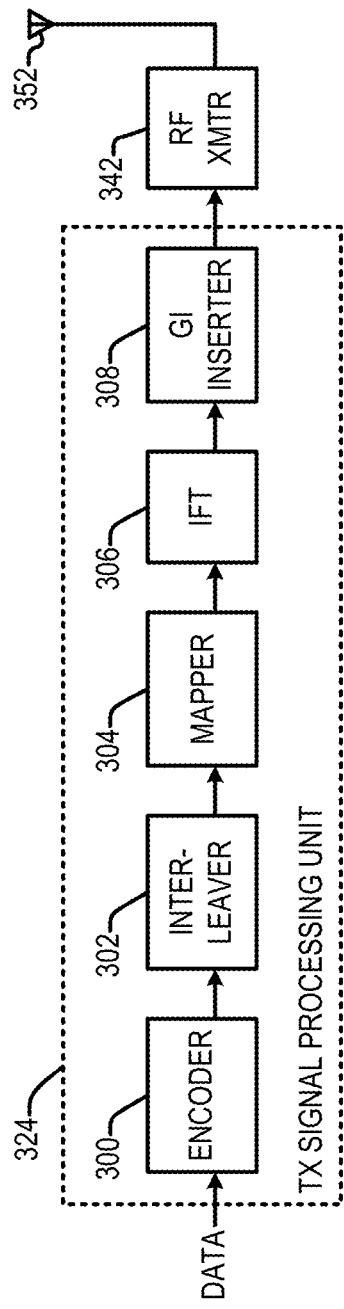
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
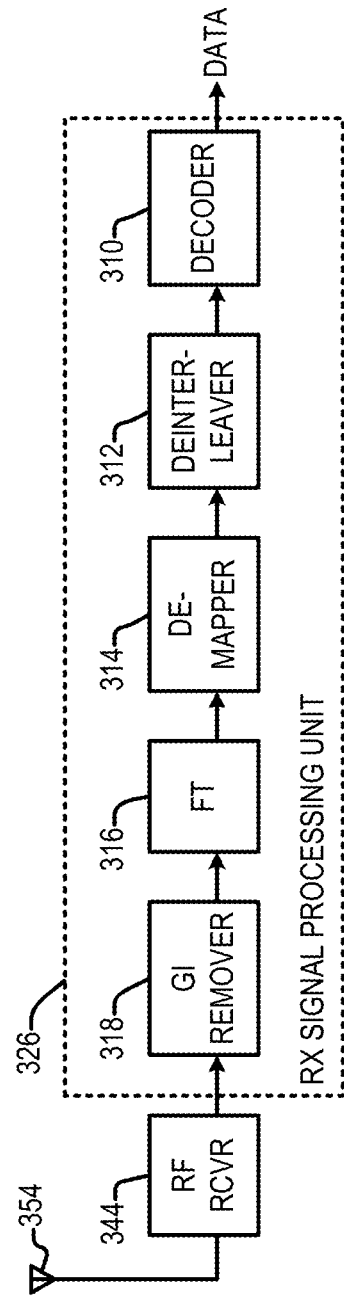
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
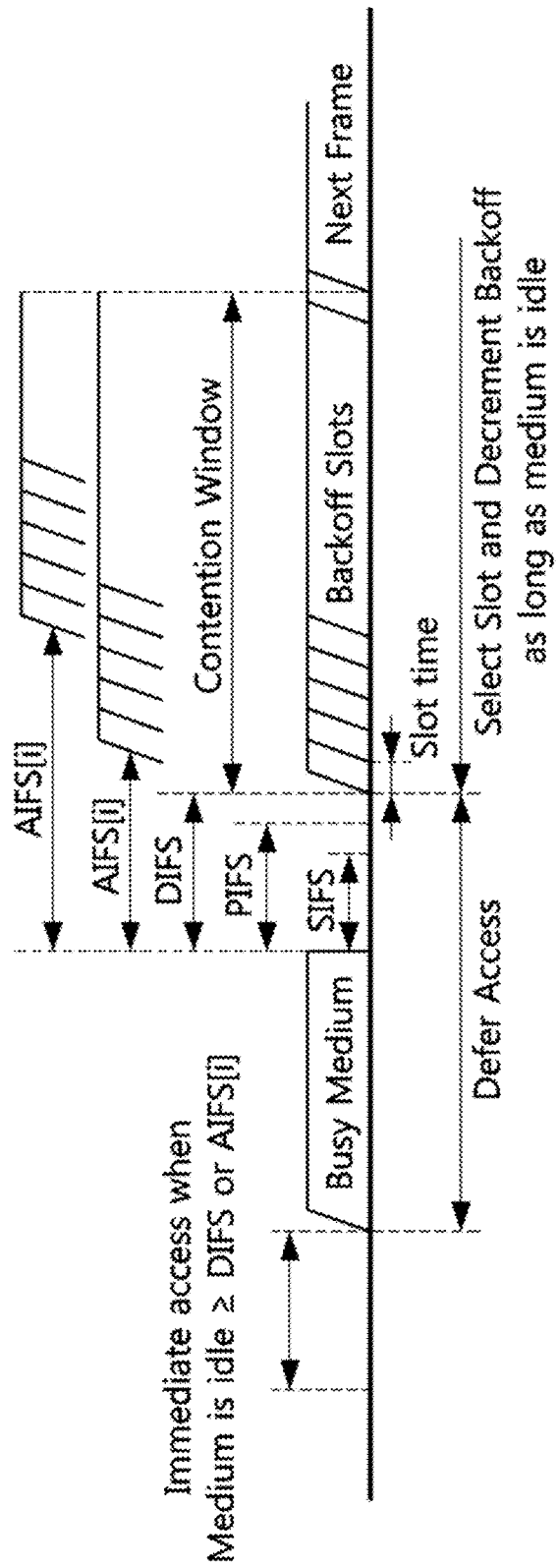
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
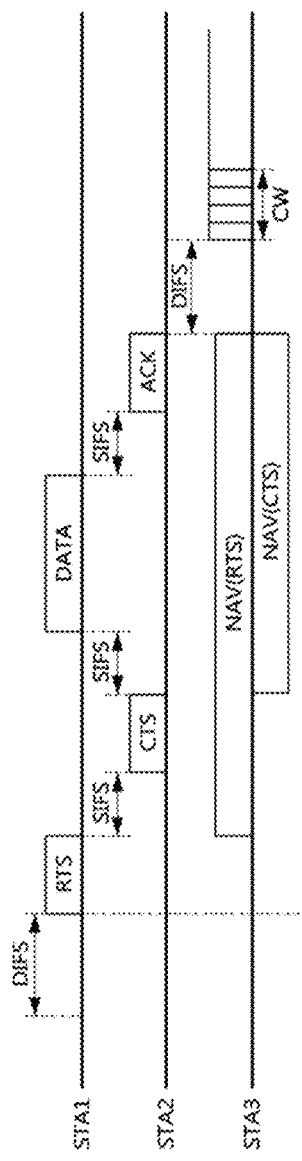
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HARQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

In some embodiments, a STA finds neighboring APs and estimates the relative distance to each neighboring AP to obtain an OBSS status. The STA can receive packets including a transmit power used field (e.g., as defined in IEEE 802.11md) from multiple APs that are located within the receiving range of the STA. When the transmit power user field is included in the received packet, the STA can estimate the path-loss from the AP that transmitted the packet to the STA according to Equation 1.

$$PL_i = P_{TX,i} - RCPI_i \quad \text{Equation 1}$$

In Equation 1, $PL_i$ is the path-loss from the transmitting AP (denoted by the ith AP), $P_{TX,i}$ is the TX power of the received packet, which is included in the received packet, and $RCPI_i$ (received channel power indicator) is the power of the received packet. Here, all three values are in a decibel (dB or dBm) scale. Because the source address (e.g., a MAC address of the transmit AP) is also available in the MAC header of the received packet, the STA can estimate relative distance from the neighboring APs using the APs' MAC addresses and path-loss values. Therefore, this information (e.g., neighboring AP address and path-loss) can be regarded as OBSS status information.

Assuming that the process of performing an AP cooperative transmission is initiated and controlled by an associated AP, which is associated with a target STA, OBSS status information can be delivered to the associated AP, which is called a master AP. The master AP can send a request to report the OBSS status information to a STA, which is a candidate OBSS STA. Such an OBSS status report request can be sent in several ways.

Figure 8:
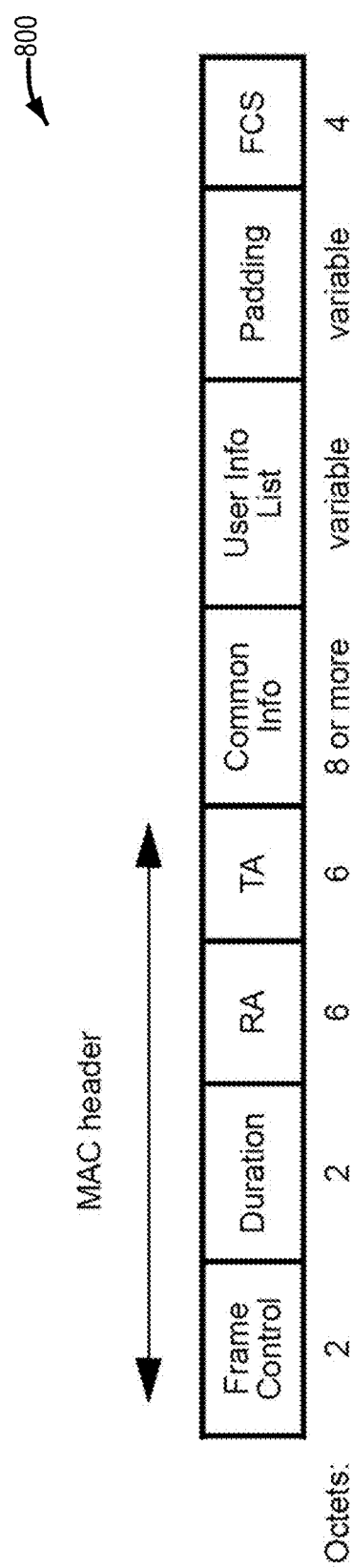
FIG. 8 shows a trigger frame, including a common information field and a set of user information fields, in accordance with some embodiments of the present disclosure.
Figure 9:
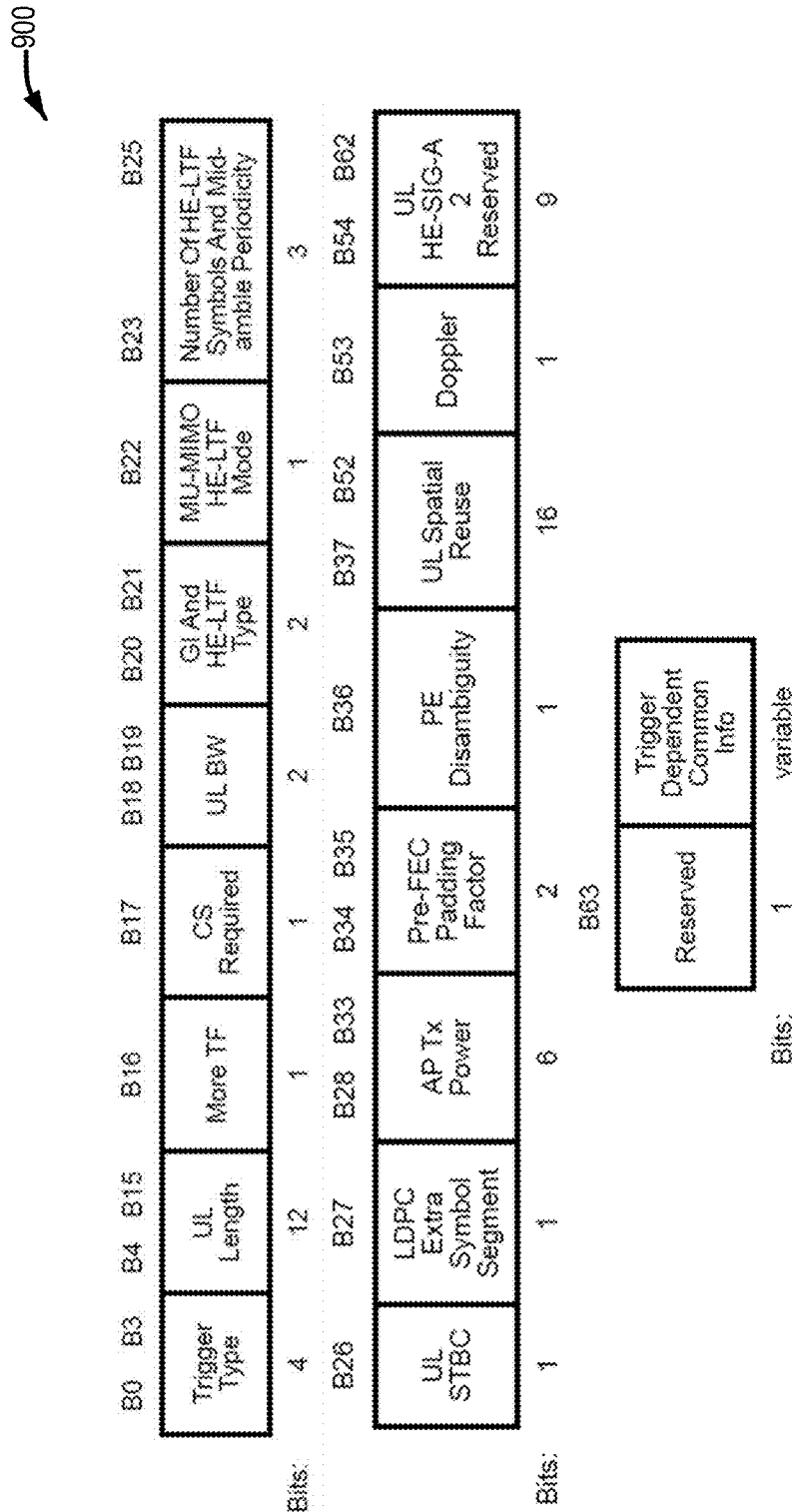
FIG. 9 shows a common information field, in accordance with some embodiments of the present disclosure.
Figure 10:
FIG. 10 shows a user information field, in accordance with some embodiments of the present disclosure.

In one embodiment, a trigger frame can be adapted for use with an OBSS status report request. For example, FIG. 8 shows a trigger frame 800 used in an IEEE 802.11ax wireless network. As shown, the trigger frame 800 includes a frame control field, a duration field, a receiver address field, a transmitter address field, a common information field (sometimes referred to as a common info field), a set or list of user information fields (sometimes referred to as user info fields), a padding field, and a frame check sequence (FCS) field. In the trigger frame 800, the common information field and the user information field(s) can be based on the examples shown in FIGS. 9 and 10, respectively. In particular, FIG. 9 shows a common information field 900 for the trigger frame 800, according to one example embodiment. As shown, the common information field 900 includes a trigger type subfield, an uplink (UL) length subfield, a more trigger frame (TF) subfield, a CS required subfield, an uplink (UL) bandwidth (BW) subfield, a guard interval (GI) and HE-LTF type subfield, a multi-user multiple-input multiple output (MU-MIMO) high efficiency (HE) long training field (LTF) mode subfield, a number of HE-LTF symbols and midamble periodicity subfield, an uplink (UL) space-time block code (STBC) subfield, a low-density parity-check (LDPC) extra symbol segment subfield, an access point (AP) transmission (Tx) power subfield, a pre-forward error coding (FEC) padding factor subfield, a packet extension (PE) disambiguity subfield, a UL spatial reuse subfield, a doppler subfield, an uplink (UL) HE-SIG-A2 reserved subfield, a reserved subfield, and a trigger-dependent common information subfield. FIG. 10 shows a user information field 1000 for the trigger frame 800, according to one embodiment. As shown in FIG. 10, the user information field 1000 can include an association identifier (AID) subfield (i.e., an AID12 subfield), a resource unit (RU) allocation subfield, an uplink (UL) forward error correction (FEC) coding type subfield, an uplink (UL) HE modulation and coding scheme (MCS) subfield, an uplink (UL) dual carrier mode (DCM) subfield, a spatial stream (SS) allocation/random access resource unit (RA-RU) information subfield, a UL target received signal strength indicator (RSSI) subfield, a reserved subfield, and a trigger-dependent user information subfield.

Because the encoded values of 8 through 15 in the trigger type subfield are reserved in the common information field 900, one of the reserved values, which can be denoted by 'A' (for example, A=8) can be used to define another variant of the trigger type subfield (i.e., a value of the trigger type subfield can be defined to indicate another type of trigger frame other than those used in previous generations of IEEE networks). In some embodiments, other changes can be made to bit assignments and encoding for other subfields dependent on the system parameters of the enhanced network system (e.g., the next version of IEEE 802.11ax). For example, the UL BW subfield can be extended from 2-bits to 3-bits to support a 320 MHz bandwidth in addition to 20, 40, 80, and 160 MHz channel bandwidths of IEEE 802.11ax network systems.

In some embodiments, the user information field format for a trigger frame is the same as shown in FIG. 10 from the AID12 subfield to the reserved subfield, with the exception that an additional bit assignment can be made. For example, the RU allocation subfield and the SS allocation subfield can be extended to support at most 320 MHz and 16 spatial streams. To define a new variant of the trigger frame 800 corresponding to a value of A for the trigger type subfield, a new trigger-dependent user information subfield is defined as shown in FIG. 11.

Figure 11:
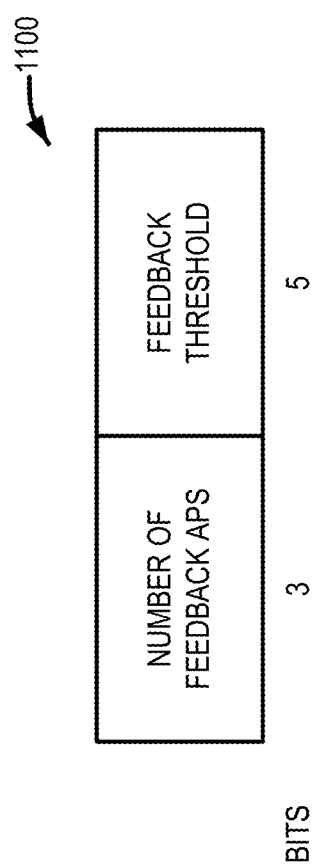
FIG. 11 shows a trigger-dependent user information subfield, in accordance with some embodiments of the present disclosure.

In particular, FIG. 11 shows a trigger-dependent user information subfield 1100 for use in the user information field 1000 of a variant trigger frame for an overlapping BSS (OBSS) status report request. As shown in FIG. 11, the trigger-dependent user information subfield 1100 includes two subfields: (1) a number of feedback APs subfield and (2) a feedback threshold subfield. The number of feedback APs subfield indicates the maximum number of neighboring APs that are reported to the master AP. Therefore, the STA, which received the variant of the trigger frame including this information, can report at most this number of neighboring APs with a OBSS status report. Since the number of feedback APs subfield is represented by three bits, the value for the number of feedback APs subfield ranges from 0 to 7.

The value of the sum of the feedback threshold subfield and the path-loss of the associated link indicates a path-loss feedback threshold (between a neighboring AP and the OBSS STA) to report to the master AP. Then the STA feeds back the OBSS status information of the neighboring AP of which path-loss is higher than (or equal to) the path-loss feedback threshold. In general, higher path-loss means a lower absolute value of the path-loss because the path-loss values have negative values. For example, the path-loss feedback threshold can be determined by Equation 2:

$$\text{pathloss feedback threshold (dB)} = \text{pathloss of the associating link (dB)} + \text{'Feedback threshold' subfield (dB)} \quad \text{Equation 2}$$

In Equation 2, the three quantities are in a decibel scale. That is, the path-loss feedback threshold is a feedback threshold subfield dB lower than the path-loss of the master AP link.

Using information from the two subfields in FIG. 11, the number of neighboring APs to be fed back to the master AP is determined. For example, assuming that number of feedback APs is 7, the feedback threshold is −10 dB, and the path-loss of the associating AP is −50 dB. At the OBSS STA, there are only three APs of which path-loss is higher than −60 dB (−50 dB+(−10 dB)) (e.g., path-loss is equal to −55 dB). In this case, the OBSS STA will feedback the OBSS status information with only three APs. When the trigger type subfield is set to A, the trigger-dependent user information subfield 1100 includes the subfields described above and shown in FIG. 11. However, if needed, additional subfields could be added. The size of the number of feedback APs subfield and the size of the feedback threshold subfield can be different depending on tradeoffs between overhead and accuracy.

As an alternative to convey the variant trigger frame for an OBSS status report request, a variant of the high-throughput (HT) control field can be used. In IEEE 802.11ax, a high-efficiency (HE) variant of the HT-control field format is defined. The HT-control field 1200 is shown in as in FIG. 12. The HT-control field 1200 includes an HE-variant in which bits B0 and B1 have the collective value "11" for use in IEEE 802.11ax network systems.

Figure 13:
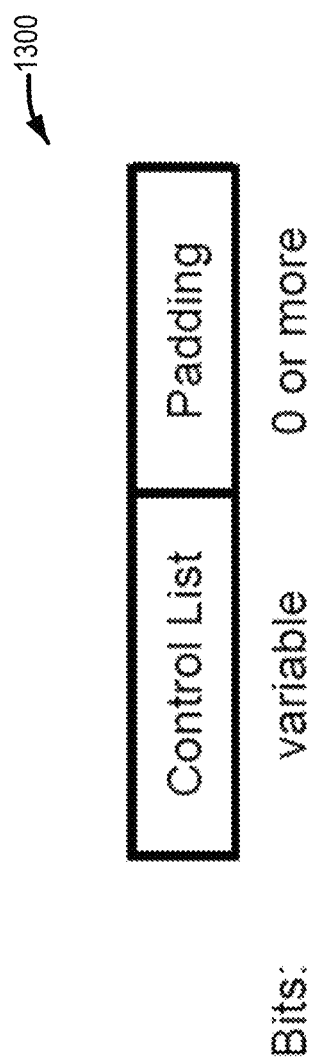
FIG. 13 shows an A-control subfield, including a control list subfield and a padding subfield, in accordance with some embodiments of the present disclosure.
Figure 14:
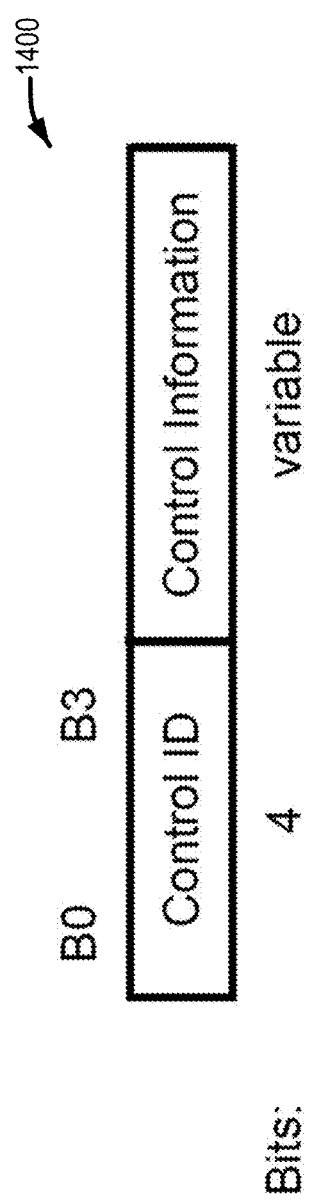
FIG. 14 shows a control list subfield, in accordance with some embodiments of the present disclosure.

The aggregated control (A-control) subfield in FIG. 12 consists of or otherwise includes a control list subfield and a padding subfield, which are shown in FIG. 13. In particular, FIG. 13 shows an A-control subfield 1300 of the HE variant HT control field format for use in IEEE 802.11ax network systems. The control list subfield in the A-control subfield 1300 contains one or more control subfields. The format of each control subfield is shown in FIG. 14. As shown in FIG. 14, the controls list subfield 1400 includes a control identifier (ID) subfield and a control information subfield. The control ID subfield indicates the type of information carried in the control information subfield. The values of the control ID subfield and the associated length of the control information subfield can be defined by table 1500 in FIG. 15.

To use the A-control subfield for the purpose of OBSS status report requests, the HT-variant A-control field can be used with one of the reserved values of the control ID subfield (e.g., control ID value=B and B can be one of values from 7 to 14). The length of the control information subfield can be defined using 8 bits. These 8 bits can represent the number of feedback APs and feedback threshold subfields in FIG. 11. If needed, additional subfields can be added. The size of the number of feedback APs subfield and the size of the feedback threshold can be different based on tradeoffs between overhead and accuracy.

In case the space is insufficient, some subfields could be determined as default values. For example, without the number of feedback APs subfield, the number of feedback APs could be fixed as four or some other value. Then a STA feeds back the OBSS status information of neighboring APs without needing to explicitly indicate the number of feedback APs.

If the reserved control identifier value is unavailable (i.e., the value is used to represent another set of control information), an additional variant of the HT-control field can be defined (e.g., an extreme HT (EHT) variant of the HT-control field). To this end, bits B0, B1, B4, and B5 in the HT-control field can be set with the value "1101." In IEEE 802.11ax network systems, bits B2, B3, B4, and B5 in the A-control subfield already uses the values "0000", "1000", "0100", "1100", "0010", "1010", "0110", and "1111" (i.e., the control ID values from 0 to 6 and 15 are already used as shown in FIG. 15). Therefore, setting bits B0, B1, B4, and B5 with the value "1101" can distinguish a new defined EHT variant of the HT-control field from other HT-control fields, as shown in FIG. 16. In this case, a new A-control EHT subfield can have 28 bits. The A-control EHT subfield consists of or otherwise includes control list and padding subfields, and the control list subfield can include one or multiple pairs of control ID and control information subfields. Therefore, one value for the control ID subfield can be assigned to an OBSS status report request. Moreover, the number of feedback APs and feedback threshold subfields in FIG. 11 is included in the control information subfield.

Figure 17:
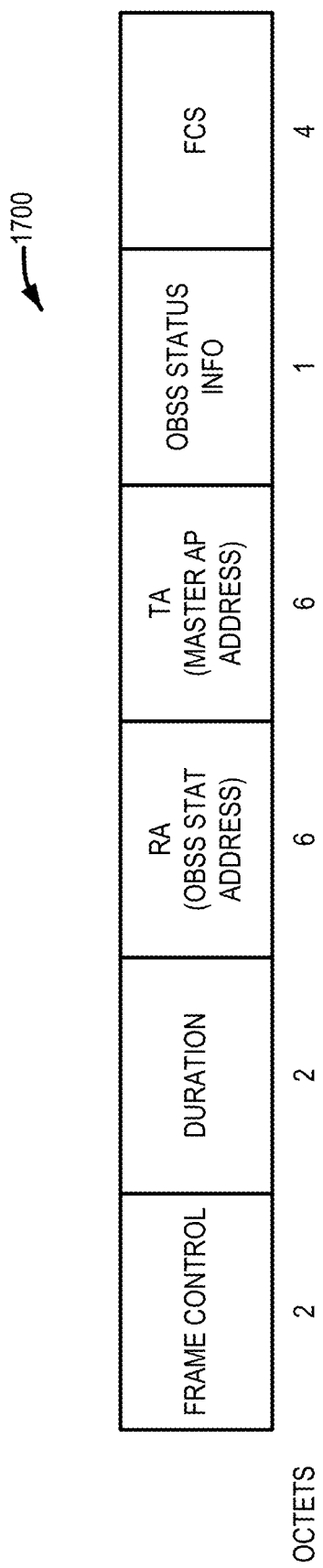
FIG. 17 shows an example of an overlapping basic service set (OBSS) status report request control frame, in accordance with some embodiments of the present disclosure.

Another method to convey the OBSS status report request information to a STA can include a new control frame. FIG. 17 shows an example of an OBSS status report request control frame 1700, according to one example embodiment. To define the new OBSS status report request control frame 1700, the reserved subtype bits B7, B6, B5, and B4 are used with the type subfield bits B3 and B2 with a value of "01" in the frame control field, wherein the MAC header contains a 2-byte frame control field.

In some embodiments, additional subfields can be added to the OBSS status information field. The size of the number of feedback APs subfield and the size of the feedback threshold subfield can be adjusted in these embodiments based on a tradeoff between overhead and accuracy.

As a response to an OBSS status report request, an OBSS status report field can be defined as a new management and extension frame body component. In particular, OBSS status information is fed back to the master AP from the OBSS STA by using an OBSS status report field. In some embodiments, a number of OBSS APs field, an AP address field (for each AP), and a path-loss field (for each AP) are included in OBSS status report information. For example, FIG. 18 shows fields included in an OBSS status report field of an OBSS status report request for K APs.

The number of OBSS APs field indicates the number of OBSS APs of which a MAC address (BSS color) and a path-loss fields are fed back. This value is determined by the number of feedback APs and feedback threshold information in the OBSS status report request information. Further, the number of OBSS APs is denoted by K. If the number of neighboring APs is less than the number indicated in the OBSS status report request information, the last AP address(es) could be set to a specific value, wherein the specific value indicates no OBSS AP and its corresponding path-loss could be set to be reserved.

AP address i (for i=1, . . . , K) is a MAC address of the i-th OBSS AP to be fed back. BSS-color information (i.e., a compressed AP address) can replace a 6-byte MAC address when space does not permit a 6-byte address. However, to avoid ambiguity when the 6-bit BSS color is used for identification of an OBSS AP, a 6-byte MAC address of the AP is used.

Path-loss i (for i=1, . . . , K) is a path-loss value in a dB scale between the OBSS STA and i-th OBSS AP. This is calculated according to Equation 3:

$$(\text{Pathloss } i)(\text{dB}) = (\text{Tx power of } i_{th} \text{ OBSS AP}) \\ (\text{dBm}) - \text{RCPI (or RSSI) (dBm)} \qquad \text{Equation 3}$$

In Equation 3, the value of Tx power of i-th OBSS AP is available in the received packet (e.g., Transmit Power Used field) and the value of received channel power indicator (RCPI) (or RSSI) denotes the received power of the received packet/signal from i-th OBSS AP. Because the RCPI and RSSI values are calculated in the physical layer of the OBSS STA, this information can be used directly. In some embodiments, RSSI could be measured: (1) by the physical (PHY) layer of the power observed at the antennas used to receive the current PPDU and measured during the reception of the beamformed LTF field (e.g., EHT-LTF field) and/or (2) by the PHY layer of the power observed at the antennas used to receive the current PPDU and measured during the reception of a non-HE or EHT portion (e.g., L-LTF) of the PPDU preamble.

Figure 19:
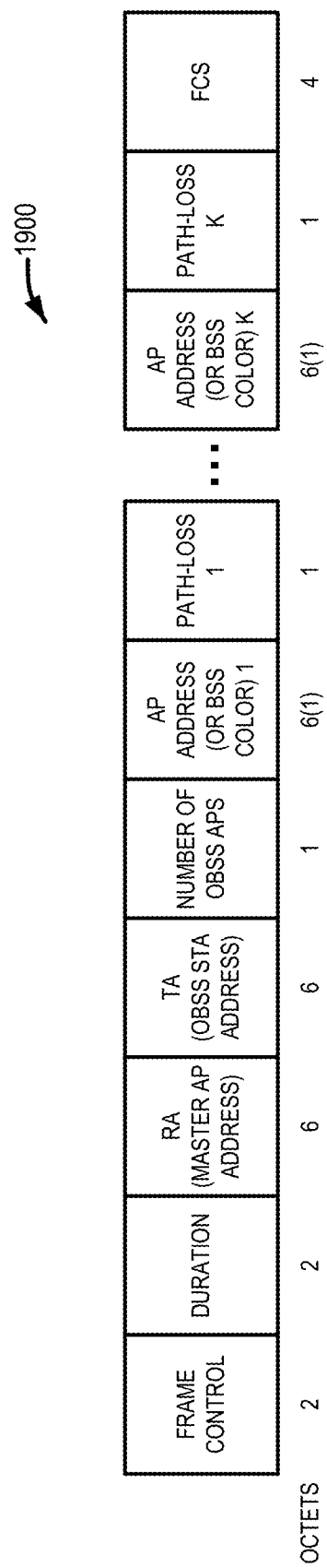
FIG. 19 shows an example of a proposed OBSS status report frame, in accordance with some embodiments of the present disclosure.

In some embodiments, OBSS status report information can be delivered as a new control frame. For example, FIG. 19 shows an example of a proposed OBSS status report frame 1900 with OBSS status report fields. Because this is a new control frame, one value of the reserved subtype bits B7, B6, B5, and B4 can be used with the type subfield value of "01" for bits B3 and B2 in the frame control field (wherein MAC header contains a 2-byte frame control field).

Figure 20:
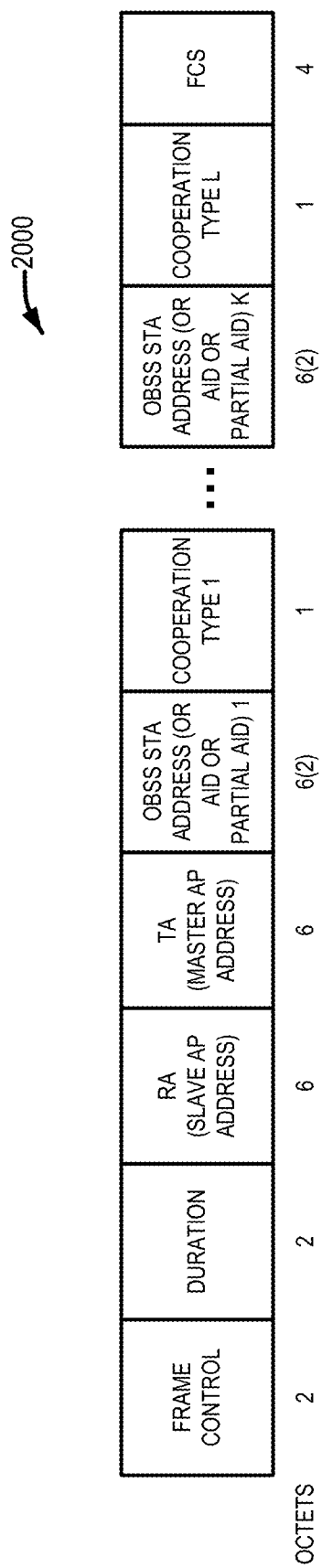
FIG. 20 shows an example of the access point (AP) cooperative request frame, in accordance with some embodiments of the present disclosure.

After receiving a frame including the OBSS status report field (or an OBSS status report frame), the master AP can decide one or multiple slave APs among the feedback APs in the OBSS status report frame for an AP cooperative/coordinated transmission. The master AP requests for AP cooperation to serve the OBSS STA with a certain mode of cooperative transmission via an AP cooperation request frame. An example of the AP cooperative request frame 2000 is shown in FIG. 20. Because this is a new control frame, one value of the reserved subtype bits B7, B6, B5, and B4 can be used with the type subfield value of "01" for bits B3 and B2 in the frame control field (wherein MAC header contains a 2-byte frame control field). Based on the OBSS status information from STAs through frame exchanges, a master AP is ready for AP cooperation/coordination. In the proposed AP cooperation request frame 2000, OBSS STA address i and cooperation type i fields (for i=1, . . . , L) are included. Here, L denotes the number of OBSS STAs which need an AP cooperative transmission. The size and meaning of each field are listed in FIG. 21.

In some embodiments, additional subfields can be added/included in the AP cooperation request frame. The size of the OBSS STA address subfield and the size of the cooperation type subfield could be differently sized based on tradeoffs between overhead and accuracy.

In the OBSS STA address i field, a MAC address of the STA is used for the AP cooperative transmission. Instead of the MAC address, an association identifier/ID (AID) or partial AID can be used to reduce the length of this field. In the cooperation type i field, one of the AP cooperation transmission modes, including cooperative OFDMA, cooperative beamforming, and joint transmission is indicated. As an alternative, both fields can be combined within one field with a size of 2 octets.

In some embodiments, an address of a STA could be set to a specific value (e.g., C), which indicates the allowance of space to be occupied by slave APs to choose its associated STAs. The last several OBSS STA addresses could be used for this. In this case, the master AP does not have enough information about the STA to be assigned. Accordingly, the master AP sets a value that indicates a default mode in a cooperation type. The default mode could be predetermined or the master AP sets a specific value that indicates the type that is determined by the slave AP with the response frame.

This AP cooperation request information can be conveyed with a new variant of a trigger frame, an A-control subfield in a variant of HT-control field, and/or a management and extension frame body component.

Figure 22:
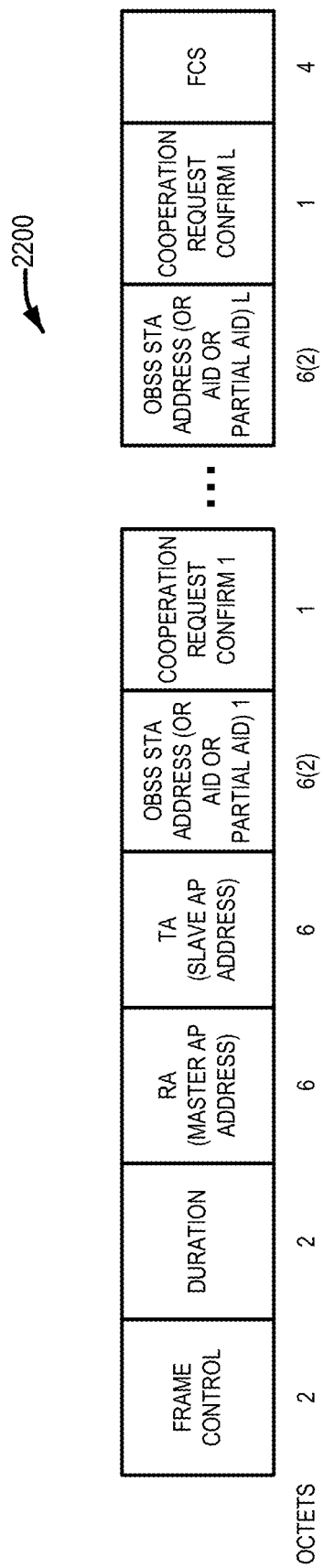
FIG. 22 shows an AP cooperation confirmation frame, in accordance with some embodiments of the present disclosure.

After receiving the AP cooperation request, a slave AP sends back an AP cooperation confirmation frame to the master AP. This AP cooperation confirmation information can be conveyed in a form of a new control frame as shown in FIG. 22. In particular, FIG. 22 shows an AP cooperation confirmation frame 2200.

The field format, such as size and meaning, in the AP cooperation confirmation frame 2200 is shown in FIG. 23. The OBSS STA address i (for i=1, . . . , L) are the same as in the AP cooperation request fields. For each OBSS STA, a slave AP confirms the cooperation type with one or more of three different ways. The slave AP can accept or decline the cooperation request depending on its own status, such as the number of currently supporting STAs and/or queue status. Even in case of acceptance, a slave AP can request to change the cooperation type. If needed, both fields can be combined within one field with a size of 2 octets.

When a slave AP transmits information of an unassigned STA by the master AP, it can occupy the unassigned STA address in an AP cooperation confirmation field as a response. In this case, the confirmation request information could be set to a same value as in the AP cooperation request frame. Alternatively, the slave AP decides the type itself if the master AP allows this behavior. Receiving that information back as a response, the master AP can ignore those STAs.

To simplify the AP cooperation confirmation information, a slave AP can send only OBSS STA address fields that are accepted for an AP cooperation transmission. That is, for OBSS STAs that are declined AP cooperation, their addresses are not included in the AP cooperation confirmation information. This AP cooperation confirmation information can be conveyed with a new variant of a trigger frame, an A-control subfield in a variant of HT-control field, or a management and extension frame body component.

Figure 24:
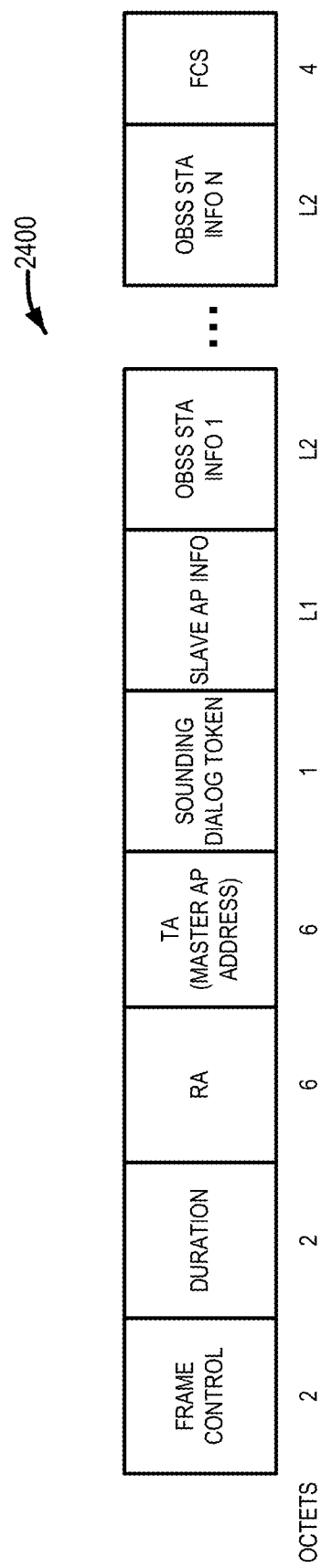
FIG. 24 shows an AP cooperative null data packet (NDP) Announcement (NDPA) frame, in accordance with some embodiments of the present disclosure.
Figure 25:
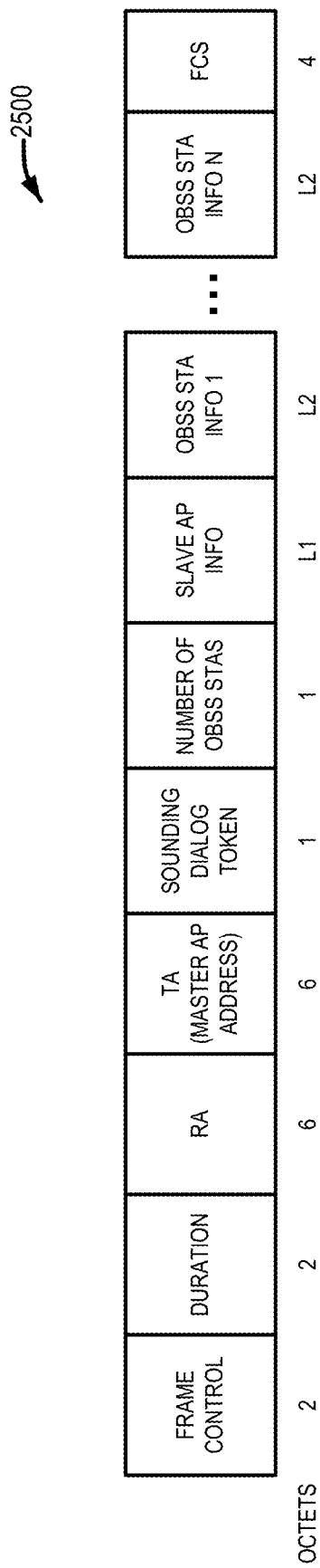
FIG. 25 shows an AP cooperative NDPA frame with a number of OBSS STA information subfield, in accordance with some embodiments of the present disclosure.

After determining the slave AP and AP cooperation type, the master AP sends a null data packet (NDP) Announcement (NDPA) frame for explicit feedback of the cooperative transmission. An AP cooperative NDPA frame 2400 is shown in FIG. 24. When multiple slave APs exist, the number of slave AP information fields can be extended. If needed, the number of OBSS STA information subfields (i.e., "n") can be increased with a 1-byte subfield as shown in FIG. 25. In particular, FIG. 24 shows an NDPA frame 2400 without a number of OBSS STA information subfield and FIG. 25 shows an NDPA frame 2500 with a number of OBSS STA information subfield.

To distinguish the proposed NDP announcement frame from other NDP announcement frames (e.g., VHT, HE, etc.), a sounding dialog token subfield of the NDP announcement frame can be generated as shown in FIG. 26. As shown in FIG. 26, bits B0 and B1 bits are used to indicate an EHT AP cooperative NDP announcement frame. In particular, the bit value of "11" is used to indicate an EHT AP cooperative NDP announcement frame while the bit value of "10" is used to indicate a EHT NDP announcement frame.

Figure 27:
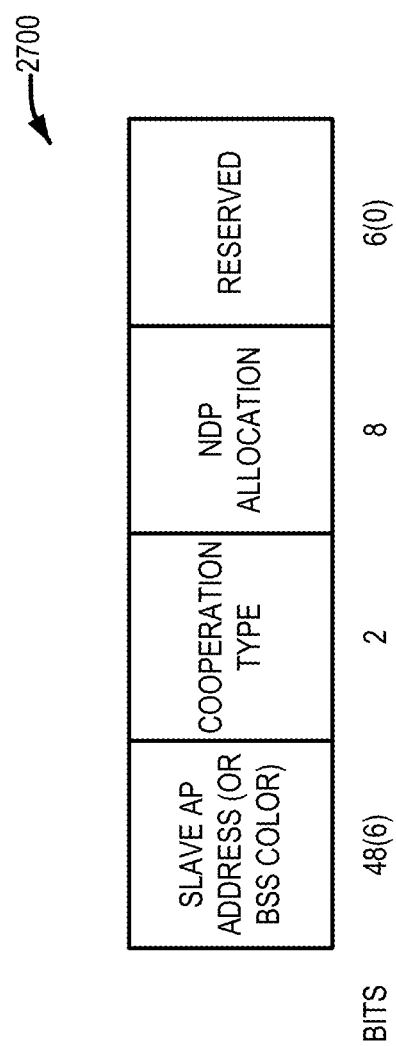
FIG. 27 shows a slave AP information subfield for a NDPA, in accordance with some embodiments of the present disclosure.

The slave AP information subfield of the NDP announcement frame can be configured as shown in FIG. 27. In particular, the slave AP information subfield 2700 can include a slave AP address (or BSS color) subfield, a cooperation type subfield, a NDP allocation subfield, and a reserved subfield, as shown in FIG. 27. The slave AP address (or BSS color) subfield indicates a slave AP identifier by using a MAC address (48 bits) or BSS color information (6 bits). The cooperation type subfield indicates the type of AP cooperative transmission (e.g., cooperative OFDMA, cooperative beamforming, or joint transmission) with two bits. The NDP allocation subfield indicate the EHT-LTF generation method for an NDP frame of the slave AP. The EHT-LTFs generation method can be informed by allocating rows of a P matrix, which is used for HE LTF generation in IEEE 802.11ax. In detail, the first 4 bits are used to indicate a starting row index of a P matrix and the last 4 bits are to indicate the end row index of the P matrix. Because at most 16 rows exist, 4 bits for each row index are allocated. As an alternative, frequency multiplexing can be used to distinguish NDP frames (EHT-LTFs). For example, a master AP sends an NDP frame with even-indexed subcarriers and a slave AP sends an NDP frame with odd-indexed subcarriers. Because the master and slave AP's NDP frames are frequency multiplexed, they can be distinguished even though NDP frames use the same rows of a P matrix. Such allocation information can be indicated with subcarrier allocation information in addition to the row allocation of the P matrix. The reserved bits are used to make the total number of bits of the slave AP information subfield to be a multiple of 8 bits.

If needed, additional subfields could be added to the slave AP information subfield. For example, an additional subfield in the slave AP information subfield could include a disambiguation subfield if there is ambiguity between different NDP announcement frames. The disambiguation subfield/bit can correspond to the most significant bit (MSB) of the AID12 of the second STA a VHT NDP announcement frame (e.g., a VHT NDP announcement frame) and is set to 1 such that the AID12 can represent more than 2048 unique addresses, where STAs (e.g., VHT STAs) do not have AID12 values greater than 2048. In some embodiments, the size of each subfield in FIG. 27 could be differently defined depending on tradeoffs between overhead and accuracy.

For the OBSS STA information subfield of a cooperative NDPA frame, the STA information field from an IEEE 802.11ax wireless network or a modified version can used. In some embodiments, the modifications can include: (1) a partial bandwidth information bit extension can be used to support wider bandwidths (e.g., from 160 MHz in IEEE 802.11ax wireless networks to 320 MHz) and (2) an Nc indication bit extension, which extends the possible values for indicating a number of columns of a beamforming matrix to support more antennas (e.g., 16 antennas instead of 8 antennas for IEEE 802.11ax wireless networks). To accommodate more bits, the number of bits in the OBSS STA information subfield can be increased or the reserved values of AID12/AID11 shown in FIG. 28 can be used. AID11 is the 11 least significant bits (LSBs) of an AID12. For example, in a STA information subfield with an AID11 of 2047, this indicates a disallowed subchannel bitmap in an IEEE 802.11ax wireless network. In a disallowed subchannel bitmap subfield in an HE NDP announcement frame, the lowest numbered bit of the disallowed subchannel bitmap subfield corresponds to the 20 MHz subchannel that lies within the BSS width and that has the lowest frequency of the set of all 20 MHz subchannels within the BSS width. Each successive bit in the bitmap corresponds to the next higher frequency 20 MHz subchannel. A bit in the bitmap is set to 1 to indicate that for the corresponding 20 MHz subchannel, no energy is present in the HE sounding NDP associated with this HE NDP announcement frame.

At the slave AP, carrier frequency offset (CFO) and symbol clock offset (SFO) (i.e., timing offset) are estimated during the receiving process of the AP cooperative NDP announcement frame, which is transmitted by the master AP. Then, the estimated CFO and SFO are synchronization mismatch values between the master AP and the slave AP. For synchronized transmission of an NDP frame and the following frames under cooperation, the slave AP should be synchronized with a master AP with this offset information. When transmitting an NDP and following cooperative packets, the estimated CFO and SFO should be pre-compensated at the transmit side.

In addition, if needed, a master AP can adjust its transmit power to make the received power of both APs the same or similar at the OBSS STA. To this end, a path-loss value in the OBSS status report information can be used. If the transmit power control of the slave AP is needed, the transmit power information for the slave AP can be included in the AP cooperation request frame or the AP cooperative NDPA announcement frame.

Figure 29:
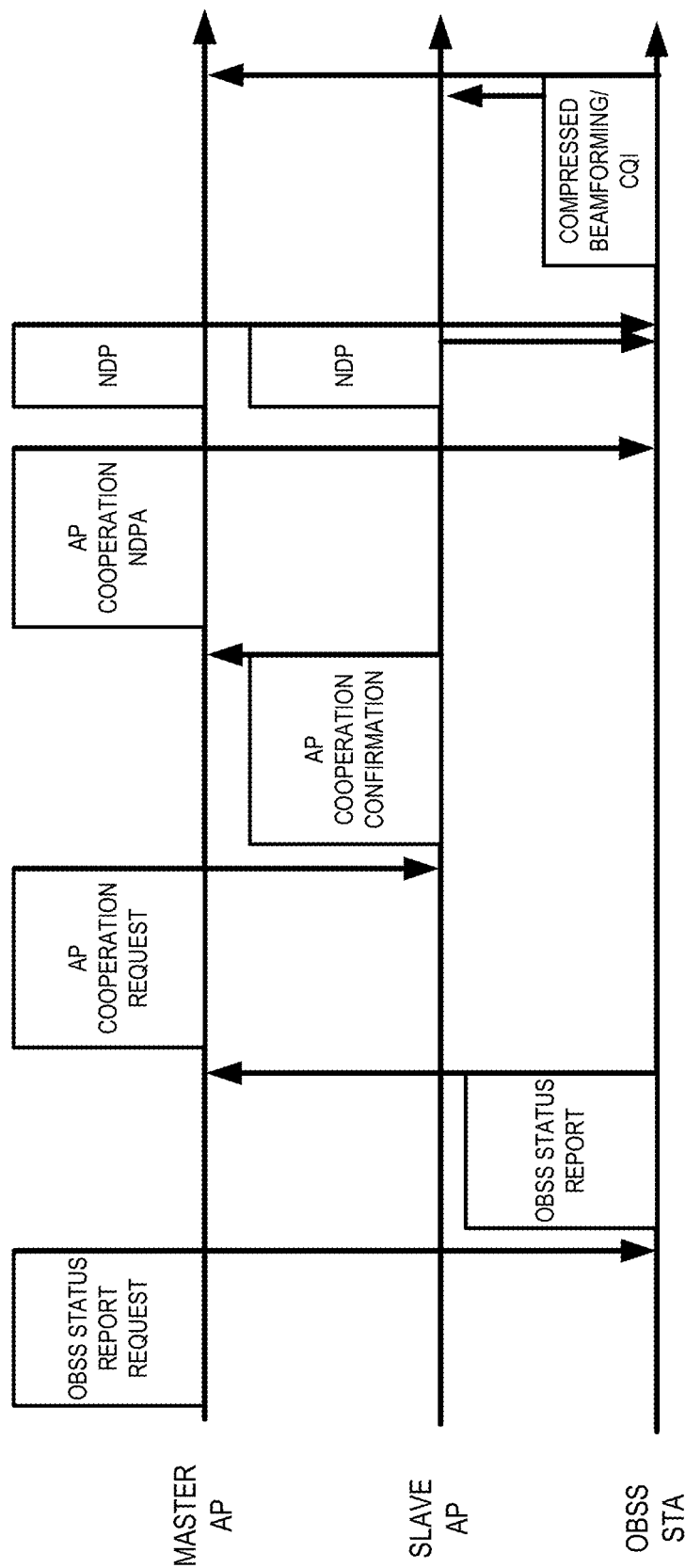
FIG. 29 shows an example of a frame exchange sequence for OBSS status exchange and AP cooperative NDP transmission, in accordance with some embodiments of the present disclosure.

Several frames and field information for OBSS status exchange and AP cooperation NDP transmission are described herein. An example of the overall frame exchange sequence is shown in FIG. 29. In particular, FIG. 29 shows an example of a frame exchange sequence for OBSS status exchange and AP cooperative NDP transmission. In the frame exchange sequence in FIG. 29, a master AP initiates the process of OBSS status exchange and channel sounding. In a different scenario, OBSS status information can be conveyed to the master AP during an association procedure. For example, in the association request frame, OBSS status information can be included. In this case, the OBSS status report request frame can be skipped and an OBSS status report frame is used.

In some embodiments, the AP cooperation confirmation step between the master AP and slave AP can be skipped. Assuming that the capability of AP cooperation information is included in the beacon frame, the master AP can collect the AP cooperation capability of the neighboring AP, which are candidates of AP cooperation. It can also be assumed that the neighboring APs (candidates of AP cooperation), which indicate AP cooperation capability in the MAC capability field in the beacon frame, have to accept the cooperation request from any master AP. Under such a scenario with the above assumptions, we can skip the AP cooperation confirmation frame.

Turning to FIG. 30, a method 3000 will be described for performing a cooperative transmission in a wireless network. In some embodiments, the method 3000 may be performed in relation to one or more of the details described in other portions of the description. Although described and shown in a particular order, in other embodiments one or more of the operations of the method 3000 may be performed in a different order, including in partially or entirely overlapping time periods.

As shown in FIG. 30, the method 3000 commences at operation 3002 with a wireless station receiving, from a first access point, an overlapping basic service set (OBSS) status report request, which requests information from the wireless station regarding a set of neighboring access points, including a second access point. In some embodiments, the OBSS status report request is a trigger frame that indicates one or more of (1) a number of feedback access points, which indicates a maximum number of neighboring access points to the wireless station that are to be reported by the wireless station to the first access point, and (2) a feedback threshold, which indicates a path-loss feedback threshold between a neighboring access point to the wireless station to report to the first access point. Further, in some embodiments, the one or more of (1) the number of feedback access point and (2) the feedback threshold are included in a trigger-dependent user information subfield of the trigger frame. In some embodiments, the path-loss feedback threshold is the sum of (1) a path-loss between the first access point and the wireless station and (2) the value of the feedback threshold.

At operation 3004, the wireless station transmits to the first access point in response to receipt of the OBSS status report request, an OBSS status report that indicates path-loss characteristics of channels between the set of neighboring access points and the wireless station. In some embodiments, the OBSS status report includes one or more of (1) a number of OBSS access points that are described by the OBSS status report, (2) an address of each access point described by the OBSS status report, and (3) a path-loss of each access point described by the OBSS status report. Further, in some embodiments, the path-loss of each access point is calculated as the sum of a transmission power of the access point and a received channel power indicator or received signal strength indicator of a signal from the access point.

At operation 3006, the wireless station receives, from the first access point, an access point cooperation null data packet announcement frame, which indicates a cooperative transmission between the first access point and the second access point to the wireless station. In some embodiments, the null data packet announcement frame indicates one or more of (1) a number of access points that are part of the cooperative transmission, (2) an address of each access point that is part of the cooperative transmission, and (3) a type of the cooperative transmission. Further, in some embodiments, the type of cooperative transmission is one of (1) cooperative orthogonal frequency-division multiple access (OFDMA), (2) cooperative beamforming, or (3) joint transmission.

At operation 3008, the wireless station receives from the first access point a first null data packet.

At operation 3010, the wireless station receives from the second access point a second null data packet. In this embodiment, the first null data packet and the second null data packet are transmitted as part of the cooperative transmission between the first access point and the second access point to the wireless station.

At operation 3012, the wireless station transmits to the first access point and the second access point a compressed beamforming report frame or a channel quality indicator frame in response to both the first null data packet and the second null data packet.

Turning to FIG. 31, a method 3100 will be described for performing a cooperative transmission in a wireless network. In some embodiments, the method 3100 may be performed in relation to one or more of the details described in other portions of the description. Although described and shown in a particular order, in other embodiments one or more of the operations of the method 3100 may be performed in a different order, including in partially or entirely overlapping time periods.

As shown in FIG. 31, the method 3100 commences at operation 3102 with a first access point transmitting to a wireless station, an overlapping basic service set (OBSS) status report request, which requests information from the wireless station regarding a set of neighboring access points, including a second access point. In some embodiments, the OBSS status report request is a trigger frame that indicates one or more of (1) a number of feedback access points, which indicates a maximum number of neighboring access points to the wireless station that are to be reported by the wireless station to the first access point and (2) a feedback threshold, which indicates a path-loss feedback threshold between a neighboring access point to the wireless station to report to the first access point. Further, in some embodiments, the one or more of (1) the number of feedback access point and (2) the feedback threshold are included in a trigger-dependent user information subfield of the trigger frame. In some embodiments, the path-loss feedback threshold is the sum of (1) a path-loss between the first access point and the wireless station and (2) the value of the feedback threshold.

At operation 3104, the first access point receives from the wireless station, an OBSS status report that indicates path-loss characteristics of channels between the set of neighboring access points and the wireless station. In some embodiments, the OBSS status report includes one or more of (1) a number of OBSS access points that are described by the OBSS status report, (2) an address of each access point described by the OBSS status report, and (3) a path-loss of each access point described by the OBSS status report. Further, in some embodiments, the path-loss of each access point is calculated as the sum of a transmission power of the access point and a received channel power indicator or received signal strength indicator of a signal from the access point.

At operation 3106, the first access point transmits to the second access point, an access point cooperation request, which requests the second access point to perform a cooperative transmission to the wireless station.

At operation 3108, the first access point transmits to the second access point, an access point cooperation confirmation, which indicates that the second access point is to participate in the cooperative transmission with the first access point.

At operation 3110, the first access point transmits to the wireless station, an access point cooperation null data packet announcement frame, which indicates a cooperative transmission between the first access point and the second access point to the wireless station. In some embodiments, the null data packet announcement frame indicates one or more of (1) a number of access points that are part of the cooperative transmission, (2) an address of each access point that is part of the cooperative transmission, and (3) a type of the cooperative transmission. Further, in some embodiments, the type of cooperative transmission is one of (1) cooperative orthogonal frequency-division multiple access (OFDMA), (2) cooperative beamforming, or (3) joint transmission.

At operation 3112, the first access point transmits to the wireless station, a first null data packet. In some embodiments, the first null data packet is transmitted as part of the cooperative transmission with the second access point, which transmits a second null data packet to the wireless station.

At operation 3114, the first access point receives from the wireless station, a compressed beamforming report frame or a channel quality indicator frame in response to both the first null data packet and the second null data packet.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A wireless station (STA) operating in a wireless network, the STA comprising:
   a memory device storing a set of instructions; and
   a processor coupled to the memory device, wherein the set of instructions when executed by the processor cause the STA to:
      receive, by the STA from a first access point (AP), an overlapping basic service set (OBSS) status report request, which requests information from the STA regarding a set of neighboring APs, including a second AP;
      transmit, by the STA to the first AP in response to receipt of the OBSS status report request, an OBSS status report that indicates path-loss characteristics of channels between the set of neighboring APs and the STA;
      receive, by the STA from the first AP, an AP cooperation null data packet (NDP) announcement frame, which indicates a cooperative transmission between the first AP and the second AP to the STA and includes an address of the first AP and the second AP;
      receive, by the STA from the first AP, a first NDP;
      receive, by the STA from the second AP, a second NDP; and
      in response to the STA receives the first and second NDPs:
         transmit, by the STA to the first AP and the second AP, one of a compressed beamforming report frame or a channel quality indicator frame,
      wherein the OBSS status report request includes a path-loss feedback threshold between a neighboring AP and the STA to report to the first AP,
      wherein the transmission of the OBSS status report only occurs in response to a path loss value of each AP exceeds the value of the feedback threshold,
      wherein the first NDP and the second NDP-are simultaneously received by the STA as part of the cooperative transmission between the first AP and the second AP.

2. The STA of claim 1, wherein the OBSS status report request is a trigger frame that indicates one or more of (1) a number of feedback APs, which indicates a maximum number of neighboring APs to the STA that are to be reported by the STA to the first AP and (2) a feedback threshold, which indicates a path-loss feedback threshold between a neighboring AP to the STA to report to the first AP.

3. The STA of claim 2, wherein the one or more of (1) the number of feedback APs and (2) the feedback threshold are included in a trigger-dependent user information subfield of the trigger frame.

4. The STA of claim 2, wherein the path-loss feedback threshold is the sum of (1) a path-loss between the first AP and the STA and (2) the value of the feedback threshold.

5. The STA of claim 1, wherein the OBSS status report includes one or more of (1) a number of OBSS APs that are described by the OBSS status report, (2) an address of each AP described by the OBSS status report, and (3) a path-loss of each AP described by the OBSS status report.

6. The STA of claim 5, wherein the path-loss of each AP is calculated as the sum of a transmission power of the AP and a received channel power indicator or received signal strength indicator of a signal from the AP.

7. The STA of claim 1, wherein the NDP announcement frame indicates one or more of (1) a number of APs that are part of the cooperative transmission, (2) an address of each AP that is part of the cooperative transmission, and (3) a type of the cooperative transmission.

8. The STA of claim 7, wherein the type of cooperative transmission is one of (1) cooperative orthogonal frequency-division multiple access (OFDMA), (2) cooperative beamforming, or (3) joint transmission.

9. The STA of claim 1, wherein the set of instructions further cause the STA to:
transmit, by the STA to the first AP and the second AP, a compressed beamforming report frame or a channel quality indicator frame in response to both the first NDP and the second NDP.

10. A first access point (AP) operating in a wireless network, the first AP comprising:
a memory device storing a set of instructions; and
a processor coupled to the memory device, wherein the set of instructions when executed by the processor cause the first AP to:
transmit, by the first AP to a wireless station (STA), an overlapping basic service set (OBSS) status report request, which requests information from the STA regarding a set of neighboring APs, including a second AP;
receive, by the first AP from the STA, an OBSS status report that indicates path-loss characteristics of channels between the set of neighboring APs and the STA;
transmit, by the first AP to the second AP, an AP cooperation request, which requests the second AP to perform a cooperative transmission to the STA;
transmit, by the first AP to the STA, an AP cooperation null data packet (NDP) announcement frame, which indicates a cooperative transmission between the first AP and the second AP to the STA and includes an address of the first AP and the second AP; and
transmit, by the first AP to the STA, a first NDP;
transmit, by the second AP to the STA, a second NDP; and
in response to the STA receives the first and second NDPs:
receive, by the first AP and the second AP, one of a compressed beamforming report frame or a channel quality indicator frame from the STA,
wherein the OBSS status report request includes a path-loss feedback threshold between a neighboring AP and the STA to report to the first AP,
wherein the transmission of the OBSS status report only occurs in response to a path loss value of each AP exceeds the value of the feedback threshold,
wherein the first NDP is transmitted as part of the cooperative transmission with the second AP, which transmits a second NDP to the STA with the transmission of the first NDP by the first AP to the STA,
wherein the STA simultaneously receives the first NDP and the second NDP as part of the cooperative transmission.

11. The first AP of claim 10, wherein the OBSS status report request is a trigger frame that indicates one or more of (1) a number of feedback APs, which indicates a maximum number of neighboring APs to the STA that are to be reported by the STA to the first AP and (2) a feedback threshold, which indicates a path-loss feedback threshold between a neighboring AP to the STA to report to the first AP.

12. The first AP of claim 11, wherein the one or more of (1) the number of feedback APs and (2) the feedback threshold are included in a trigger-dependent user information subfield of the trigger frame.

13. The first AP of claim 11, wherein the path-loss feedback threshold is the sum of (1) a path-loss between the first AP and the STA and (2) the value of the feedback threshold.

14. The first AP of claim 10, wherein the OBSS status report includes one or more of (1) a number of OBSS APs that are described by the OBSS status report, (2) an address of each AP described by the OBSS status report, and (3) a path-loss of each AP described by the OBSS status report.

15. The first AP of claim 14, wherein the path-loss of each AP is calculated as the sum of a transmission power of the AP and a received channel power indicator or received signal strength indicator of a signal from the AP.

16. The first AP of claim 10, wherein the NDP announcement frame indicates one or more of (1) a number of APs that are part of the cooperative transmission, (2) an address of each AP that is part of the cooperative transmission, and (3) a type of the cooperative transmission.

17. The first AP of claim 16, wherein the type of cooperative transmission is one of (1) cooperative orthogonal frequency-division multiple access (OFDMA), (2) cooperative beamforming, or (3) joint transmission.

18. The first AP of claim 10, wherein the set of instructions further cause the first AP to:
receive, by the first AP from the STA, a compressed beamforming report frame or a channel quality indicator frame in response to both the first NDP and the second NDP.

19. The first AP of claim 10, wherein the set of instructions further cause the first AP to:
receive, by the first AP-from the second AP, an AP cooperation confirmation, which indicates that the second AP is to participate in the cooperative transmission with the first AP.

20. A method performed by a wireless station (STA) operating in a wireless network, the method comprising:
receiving, by the STA from a first access point (AP), an overlapping basic service set (OBSS) status report request, which requests information from the STA regarding a set of neighboring APs, including a second AP;
transmitting, by the STA to the first AP in response to receipt of the OBSS status report request, an OBSS status report that indicates path-loss characteristics of channels between the set of neighboring APs and the STA;
receiving, by the STA from the first AP, an AP cooperation null data packet (NDP) announcement frame, which indicates a cooperative transmission between the first AP and the second AP to the STA and includes an address of the first AP and the second AP;
receiving, by the STA from the first AP, a first NDP; and
receiving, by the STA from the second AP, a second NDP; and
in response to the STA receiving the first and second NDPs:
transmitting, by the STA to the first AP and the second AP, one of a compressed beamforming report frame or a channel quality indicator frame, wherein the OBSS status report request includes a path-loss feedback threshold between a neighboring AP and the STA to report to the first AP,
wherein the transmission of the OBSS status report only occurs in response to a path loss value of each AP exceeds the value of the feedback threshold,
wherein the first NDP and the second NDP are simultaneously received by the STA as part of the cooperative transmission between the first AP and the second AP.

* * * * *